United States Patent Office 3,660,419
Patented May 2, 1972

3,660,419
DISUBSTITUTED-5-NITROIMIDAZOLES
Robert Gordon Shepherd, South Nyack, and Jay Donald Albright, Nanuet, N.Y., assignors to American Cyanamid Company, Stamford, Conn.
No Drawing. Filed Mar. 25, 1970, Ser. No. 22,699
Int. Cl. C07d 49/36
U.S. Cl. 260—309   4 Claims

ABSTRACT OF THE DISCLOSURE

The preparation of 1-lower alkyl-5-nitroimidazole-2-hydrazides by reacting a 1-loweralkyl-2-cyano-5-nitroimidazole with a hydrazine or salt thereof, is described. The compounds are useful as trichomonacides and as intermediates in the preparation of nitroimidazole-antiparasitic and antibacterial activity.

DESCRIPTION OF THE INVENTION

This invention relates to nitroimidazoles. More particularly, it relates to novel 1-loweralkyl-5-nitroimidazoles with novel substituents in the 2-position.

The present compounds may be illustrated as compounds of the formula:

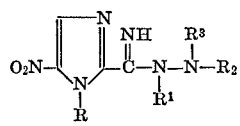

wherein R is loweralkyl, $R^1$, $R^2$ and $R^3$ are hydrogen, loweralkyl or benzyl and non-toxic acid addition salts thereof. The term loweralkyl is intended to include those having 1 to 4 carbon atoms present.

The compounds of the present invention vary in color from orange to red or reddish brown. They are insoluble in water, but are soluble in organic solvents such as ethanol, chloroform, N,N-dimethylformamide and dimethylsulfoxide.

The present compounds are bases and may be converted to their non-toxic acid addition salts by treatment with acids such as sulfuric, hydrochloric, phosphoric, succinic, citric and the like.

The present compounds are prepared by the reaction of 1-loweralkyl-2-cyano-5-nitroimidazole and a hydrazine of the formula:

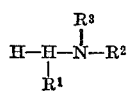

wherein $R^1$, $R^2$ and $R^3$ are as hereinbefore described, or a salt thereof. The salts may be, for example, dihydrochloride, iodide, sulfate, tartrate and the like. Also, hydrazine hydrate may be used. The reaction can be carried out at a temperature of from −10° C. to 40° C. for a period of from about ½ hour to 24 hours. The reaction is preferably carried out in a solvent in which the desired product is soluble as described hereinbefore.

The compounds of the present invention, wherein $R^1$ is hydrogen, may exist in a tautomeric form illustrated by the following:

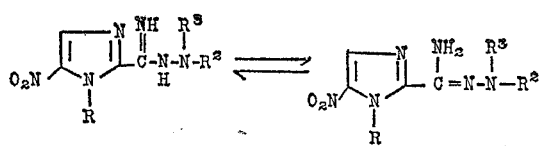

wherein A, $R^2$ and $R^3$ are as described above. The application is intended to include within its scope both tautomeric forms.

The present compounds when fed to test animals such as rats or mice show a reduction in trichomonae such as *T. vaginalis*. The compounds are useful therefore as trichomonacides. They are also useful as intermediates in preparing compounds such as 2-(2-amino-1,3,4-thiadiazol-5-yl)-1-methyl-5-nitroimidazole well known for its antiparasitic and antibacterial activity. The use as intermediates are described in the examples hereinafter.

SPECIFIC DETAIL

The following examples described in detail the preparation of repersentative compounds of this invention and their use as intermediates.

EXAMPLE 1

Preparation of 1 - methyl-5-nitro-2-imidazolecarboximidic acid hydrazide

To a solution of 45 g. of 2-cyano-1-methyl-5-nitroimidazole in 60 ml. of dimethyl formamide at 0° C. is added 16.2 ml. of hydrazine hydrate. The solution is stirred in the cold for 2 hours and 70 ml. of diethyl ether is added. The mixture is chilled and filtered and the solid washed with ether to yield 49.5 gm. of 1-methyl-5-nitro-2-imidazolecarboximidic acid hydraizde as orange crystals, melting point 199–202° C. (dec.).

EXAMPLE 2

Preparation of 1 - methyl-5-nitro-2-imidazolecarboximidic acid 1-methylhydrazide To a solution of 15.2 g. of 2-cyano-1-methyl-5-nitroimidazole in 25 ml. of dry N.N-dimethylformamide is added 5 ml. of methylhydrazine. The solution is stirred at room temperature (with occasional cooling initially for 3.5 hours. To the mixture is added 30 ml. of ether and the mixture is chilled and filtered. The solid is washed with ether to give 8.8 g. (44%) of 1-methyl-5-nitro-2'-imidazolecarboximidic acid 1-methylhydrazide as reddish-brown crystals, melting point 184–186° C.

EXAMPLE 3

Preparation of 1 - methyl-5-nitro-2-imidazolecarboximidic acid 1,2-dimethylhydrazide To a solution of 15.2 g. of 2-cyano-1-methyl-5-nitroimidazole in 25 ml. of dry N,N-dimethylformamide is added 6 ml. of N,N'-dimethylhydrazine. The solution is stirred at room temperature (with occasional cooling initially) for 10 hours. To the mixture is added 30 ml. of ether and the mixture is chilled and filtered. The solid is washed with ether to give 1-methyl-5-nitro-2'-imidazolecarboximidic acid 1,2-dimethylhydrazide as reddish colored crystals.

EXAMPLE 4

Preparation of 1 - methyl-5-nitro-2-imidazolecarboximidic acid 2,2-dimethylhydrazide To a solution of 15.2 g. of 2-cyano-1-methyl-5-nitroimidazole in 25 ml. of dry N,N-dimethylformamide is added 7 ml. of N,N-dimethylhydrazine. The solution is stirred at room temperature for 5 hours. To the mixture is added 30 ml. of ether and the mixture is chilled and filtered. The solid is washed with ether to give 1-methyl-5-nitro-2'-imidazolecarboximidic acid 2,2-dimethylhydrazide as reddish-brown crystals.

EXAMPLE 5

Preparation of 1 - methyl-5-nitro-2-imidazolecarboximidic acid-1-benzylhydrazide 9.8 g. (0.05 mole) of benzylhydrazine dihydrochloride is dissolved in 100 ml. of dimethylformamide and 10 ml.

of 10 N sodium hydroxide (0.1 mole) added. The mixture is cooled to 5°–10° C. and treated with 7.6 g. (0.05 mole) of 1-methyl-5-nitro-2-imidazolecarbonitrile. It is then stirred at room temperature for 18 hours. The deep red solution is poured into 600 ml. of ice water, precipitating a red-brown solid. The solid is collected, washed with water, and dried. Recrystallization from 125 ml. of ethanol gives the pure compound; melting at 186°–189° C. with decomposition.

EXAMPLE 6

Preparation of 2-(2-amino-1,3,4-thiadiazol-5-yl)-1-methyl-5-nitroimidazole

To a mixture of 1.06 gm. of potassium thiocyanate in 50 ml. of dry tetrahydrofuran is added 0.86 gm. of acetyl chloride. The mixture is stirred at room temperature for 4 hours to complete the formation of acetyl isothiocyanate and 2.00 gm. of 1-methyl-5-nitro-2-imidazolecarboximidic acid hydrazide is added. The reaction mixture is stirred overnight at room temperature, filtered, and the solid is washed with tetrahydrofuran and then with water to give 2.4 gm. of yellow crystals. This material is recrystallized from dimethyl sulfoxide-methanol to give 1-methyl-5-nitro-2-imidazolecarboximidic acid 2-(acetylthiocarbamoyl)hydrazide, as yellow crystals, melting point 303–307° C. (dec.).

In a similar manner 1-ethyl-5-nitro-2-imidazolecarboximidic acid 2-(acetylthiocarbamoyl)hydrazide is prepared from 1-ethyl-5-nitro-2-imidazolecarboximidic acid hydrazide.

1-methyl-5-nitro-2-imidazolecarboximidic acid 2 - (acetylthiocarbamoyl)hydrazide prepared as described above is heated with 6 N hydrochloric acid. The mixture is diluted with water and brought to pH 7 with 5 N sodium hydroxide. The solid is filtered and washed with water to give 2 - (2 - amino-1,3,4-thiadiazol-5-yl)-1-methyl-5-nitroimidazole, melting at 270–271° C.

EXAMPLE 7

Preparation of 2-(2-amino-1,3,4-thiadiazol-5-yl-1-methyl-5-nitroimidazole

To a mixture of 0.97 g. of potassium thiocyanate in 10 ml. of dry tetrahydrofuran is added 1.4 g. of benzoyl chloride. The mixture is stirred at room temperature for 3 hours to complete the formation of benzoylisothiocyanate and 1.84 g. of 1-methyl-5-nitro-2-imidazolecarboximidic acid hydrazide is added. The mixture is stirred for 16 hours at room temperature, filtered and the solid washed with 10 ml. of tetrahydrofuran and with water. There is obtained 3.8 g. of yellow crystals, 320–324° C. (dec.) (with previous sintering), which is recrystallized from dimethyl sulfoxide-ethanol to give 2.93 g. of 1 - methyl - 5-nitro-2-imidazolecarboximidic acid 2-(benzoylthiocarbamoyl)hydrazide as yellow crystals, melting point 327–331° C. (dec.) (with previous sintering).

1 - methyl-5-nitro-2-imidazolecarboximidic acid 2-(benzoylthiocarbamoyl)hydrazide is prepared as described above and without isolating the product, 6 N hydrochloric acid is added to the reaction mixture. The mixture is heated on a steam bath for 15 minutes and the product is isolated by diluting the reaction mixture with water and filtering to give N-[5-(1-methyl-5-nitro-2-imidazolyl)-1,3,4-thiadiazol-2-yl]benzamide as pale yellow crystals, melting point 346–349° C. (dec.).

A sample of N-[5-(1-methyl-5-nitro-2-imidazolyl)-1,3,4-thiadiazol-2-yl]benzamide is heated with concentrated hydrochloric to give 2-(2-amino-1,3,4-thiadiazol-5-yl)-1-methyl-5-nitroimidazole as pale yellow crystals, melting point 270–271° C.

We claim:

1. A nitroimidazolehydrazide of the formula:

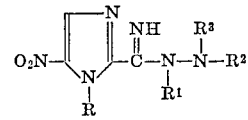

wherein R is lower alkyl, $R^1$, $R^2$, and $R^3$ are hydrogen, lower alkyl or benzyl and non-toxic acid addition salts thereof.

2. A nitroimidazolehydrazide in accordance with claim 1, 1-methyl-5-nitro-2-imidazolecarboximidic acid hydrazide.

3. A nitroimidazolehydrazide in accordance with claim 1, 1-methyl-5-nitro-2-imidazolecarboximidic acid 1-methylhydrazide.

4. A nitroimidazolehydrazide in accordance with claim 1, 1-methyl-5-nitro-2-imidazolecarboximidic acid 1 - benzylhydrazide.

References Cited

Merck, Chem. Abst., Vol. 63, columns 608–9 (1965). QD1.A51.

Merck, Chem. Abst., Vol. 64, columns 2093–4 (1966). QD1.A51.

Case, J. Org. Chem., Vol. 30, pp. 931–33 (1965). QD241.J6.

Kauffmann et al., Angew. Chem. Internat. Ed. Eng., vol. 2, p. 217 (1963), QD1.Z51.

Kauffmann et al., Chem. Abst., vol. 62, column 6392 (1965). QD1.A51.

Kauffmann et al., Chem. Abst., vol. 65, columns 15367–8 (1966). QD1.A51.

NATALIE TROUSOF, Primary Examiner

U.S. Cl. X.R.

260—306.8 D, 999